United States Patent
Sifuentes

(10) Patent No.: US 8,155,277 B2
(45) Date of Patent: *Apr. 10, 2012

(54) VOICE AND MOTION ACTIVATED TELEPHONE

(75) Inventor: Henry Sifuentes, Chicago, IL (US)

(73) Assignee: Henry Sifuentes, Chicago, IL (US)

( * ) Notice: Subject to any disclaimer, the term of this patent is extended or adjusted under 35 U.S.C. 154(b) by 1284 days.

This patent is subject to a terminal disclaimer.

(21) Appl. No.: 11/519,725

(22) Filed: Sep. 11, 2006

(65) Prior Publication Data

US 2007/0120961 A1    May 31, 2007

Related U.S. Application Data

(63) Continuation of application No. 10/679,715, filed on Oct. 6, 2003, now Pat. No. 7,116,763, which is a continuation-in-part of application No. 09/328,705, filed on Jun. 9, 1999, now Pat. No. 6,631,179.

(60) Provisional application No. 60/088,719, filed on Jun. 10, 1998.

(51) Int. Cl.
*H04M 1/64* (2006.01)

(52) U.S. Cl. .................................. 379/88.01; 379/37

(58) Field of Classification Search .... 379/88.01–88.04, 379/159, 167.01–167.05, 201.06, 37–50
See application file for complete search history.

(56) References Cited

U.S. PATENT DOCUMENTS

| | | | | |
|---|---|---|---|---|
| 4,206,318 A * | 6/1980 | Steely | ........................... | 379/185 |
| 4,431,870 A * | 2/1984 | May et al. | ................ | 379/355.09 |
| 4,924,193 A * | 5/1990 | Saito et al. | ..................... | 330/284 |
| 4,987,402 A * | 1/1991 | Nykerk | ......................... | 704/274 |
| 5,042,006 A * | 8/1991 | Flohrer | ........................ | 715/707 |
| 5,093,926 A * | 3/1992 | Sasuta | ........................... | 455/515 |
| 5,191,611 A * | 3/1993 | Lang | .............................. | 705/53 |
| 5,335,276 A * | 8/1994 | Thompson et al. | ........... | 380/266 |
| 5,406,618 A * | 4/1995 | Knuth et al. | ............... | 379/88.04 |
| 5,436,954 A * | 7/1995 | Nishiyama et al. | ........... | 455/566 |
| 5,452,340 A * | 9/1995 | Engelbeck et al. | ........ | 379/88.03 |
| 5,594,469 A * | 1/1997 | Freeman et al. | ............. | 345/158 |
| 5,680,506 A * | 10/1997 | Kroon et al. | ................. | 704/203 |
| 5,712,911 A * | 1/1998 | Her | ......................... | 379/388.01 |
| 5,767,842 A * | 6/1998 | Korth | ........................... | 345/168 |
| 5,983,100 A * | 11/1999 | Johansson et al. | ......... | 455/426.1 |
| 6,292,543 B1 * | 9/2001 | Cannon et al. | ............... | 379/67.1 |
| 6,424,646 B1 * | 7/2002 | Gerszberg et al. | ............ | 370/352 |
| 6,434,255 B1 * | 8/2002 | Harakawa | ...................... | 382/103 |
| 6,842,505 B1 * | 1/2005 | Suder et al. | ................ | 379/88.01 |

* cited by examiner

*Primary Examiner* — Simon Sing
*Assistant Examiner* — Assad Mohammed
(74) *Attorney, Agent, or Firm* — Foley & Lardner LLP

(57) ABSTRACT

A method and system for communicating without use of manual contact with a communications unit. The user approaches a communications system and can activate a communications unit by a proximity/motion detector and/or a voice activation device. The person can generate audio signals, such as by voice command, to activate the unit and establish contact. Body movements can also be used to connect to a specific location and/or control the communications mode, such as private, semi-private or conference call mode.

15 Claims, 1 Drawing Sheet

10 communications System
20 sensor
30 communications device
40 audio sensor/video display
45 speaker
60 card reader
70 payment device

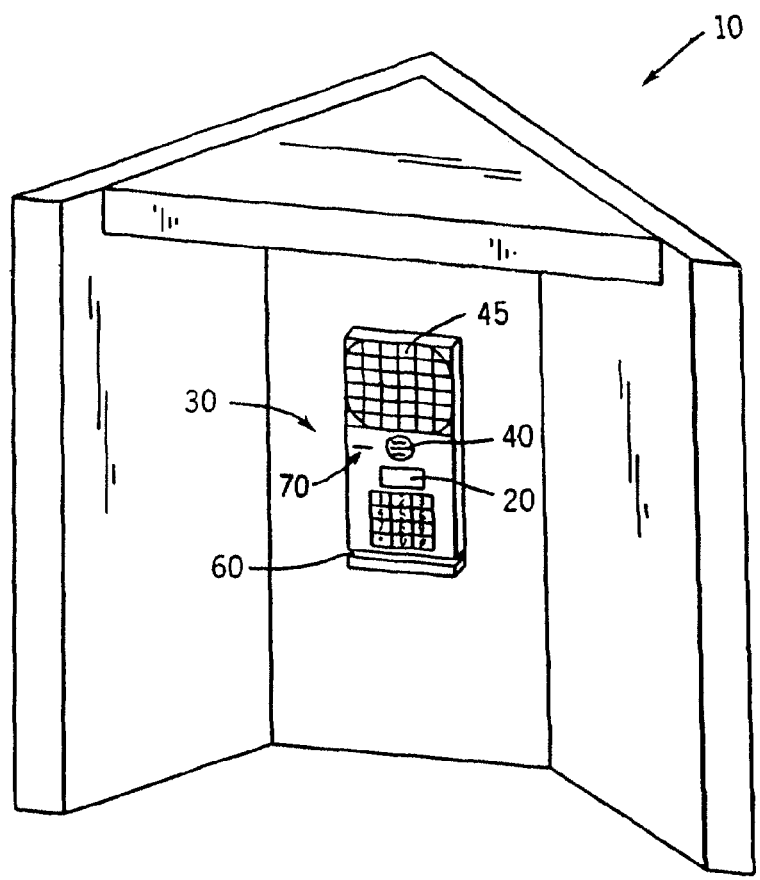
10 communications System
20 sensor
30 communications device
40 audio sensor/video display
45 speaker
60 card reader
70 payment device

VOICE AND MOTION ACTIVATED TELEPHONE

CROSS-REFERENCE TO RELATED PATENT APPLICATIONS

This application is a continuation and claims priority from U.S. patent application Ser. No. 10/679,715, filed Oct. 6, 2003 now U.S. Pat. No. 7,116,763, which itself is a continuation-in-part of U.S. patent application Ser. No. 09/328,705, filed on Jun. 9, 1999 now U.S. Pat. No. 6,631,179, which is based on U.S. Provisional Patent Application No. 60/088,719, filed Jun. 10, 1998.

This invention is concerned generally with a voice and motion activated communications device. More particularly the invention is concerned with a voice and/or motion activated telephone, particularly for use in a hazardous environment.

It is known in the art to have telephones with hands-free speaker made for use in a business office or even in the home. However, such systems do require activation by use of your hands and such systems thus do not allow entirely hands-free operation or activation of a communications device without manual manipulation of the device.

OBJECTS OF THE INVENTION

It is an object of the invention to provide an improved communications device and method of use.

It is another object of the invention to provide a novel method of use and communications device activated without manual operation.

It is a further object of the invention to provide an improved method and communications device for use in hazardous environments.

It is also another object of the invention to provide a novel method and communications device activated for operation by an electromagnetic beam or by other proximity device to sense the presence of a person.

It is an additional object of the invention to provide an improved method and communications device which is activated by voice command and further operated and deactivated by voice input alone.

It is yet a further object of the invention to provide a novel method and communications device which is activated and deactivated by encoded voice commands or by a voice recognition system.

These and other objects and advantages will be described hereinafter in the detailed description and illustrated in the drawing described hereinbelow.

BRIEF DESCRIPTION OF THE DRAWINGS

FIG. 1 illustrates a perspective of a system constructed in accordance with the invention.

DETAILED DESCRIPTION OF THE PREFERRED EMBODIMENTS

A communications system 10 constructed in accordance with an embodiment of the invention is shown in FIG. 1. In the system 10 of FIG. 1, a sensor 20, such as for example a conventional infrared beam generator/detector device or conventional RF (radio frequency) proximity beam/sensor system, is used to detect the presence of a person (not shown). This sensor 20 can activate for two-way communication a communications device 30, such as a telephone, to enable the person to communicate to another location within the building or outside the building where the person is located. In another aspect of the invention, the person can activate the communications device 30 by generating particular sound patterns, such as from a sound generating device of any kind or by a person vocalizing certain sound patterns or word patterns or even a single word, a number, a letter or combination thereof. These sound patterns are detected by conventional audio sensor 40 (such as a microphone or other conventional sensor of sound) which converts the acoustic waves to an electronic signal for analysis by a computer. In another form of the invention a combination unit can include a video display as part of the audio sensor 40 or just be a video display alone which can sense the user's image for recognition purposes. In addition, the video display 40 can act to transmit or receive visual information. The computer in turn can perform the analysis of sound recognition in accordance with a conventional computer software program to determine whether or not to generate a command to activate the two-way communication s device 30. Voice commands can also be used in conjunction with the voice recognition modality of the computer to connect to certain phone numbers, activate conference calling and maintain a call even when the person temporarily leaves the area of the system 10. This maintenance of a connection can be by an audio command for a specified time or by the computer for a predetermined time. The person can then proceed to communicate via the audio sensor and/or video display 40 with responses from the audio sensor and/or the video display 40 and/or a speaker 45, or other such conventional acoustic output devices. The person can affirmatively deactivate the system 10 or allow the device itself to deactivate by virtue of a lack of activity after a predetermined time period in the manner described hereinbefore. In another form of the invention the video display 40 can also function to selectively show the second person or their location on the screen. In this manner visual communication can also be accomplished without need for audio communication. The visual communication can even include holographic as well as two dimensional displays.

In another form of the invention, the communications device 30 can also be activated by a card reader 60 by the person using a conventional encoded magnetic card (not shown). The communications process can then proceed as described hereinbefore.

In a preferred embodiment, the system 10 is used in hazardous environments which require a person to be encumbered by protective clothing, such as large gloves or even full body covering.

In yet another form of the system 10, the volume level of the speaker 45 can be adjusted by the computer sensing the background noise level through the audio sensor 40 or even the visual information on the video display 40. This feature enables the person to hear over the background voice.

In another aspect of the invention, the system 10 can be made to enter a conference call mode to include other persons by the initial person stepping back and interrupting an infrared beam or RF proximity system of the sensor 20 and then stepping back again to a position near the audio sensor 40. Also the person can use other body motions to activate the conference call mode. In another aspect the video display 40 can be used to carry out these same functions via communication to the computer unit for analysis and processing.

In yet a further aspect of the invention, the person using the system 10 could carry out certain body language motions, such as positioning the person's hand in a certain way, which would be detected by the sensor 20 or the video display 40 and/or in combination with voice commands from the person the computer can modify the operational state of the system 10. For example, the computer could change the device from "on" to "off" or to "private", "semi-private" or a conferencing mode of communication.

In an additional embodiment, the system 10 can include a payment device 70, such as coin slots, a credit card reader, or paper money receptacles, to allow the person to pay for the communication.

In a further feature, the system 10 can include an emergency mode which allows manual dialing of the communications device 30 if operation without manual contact becomes inoperative.

While preferred embodiments have been illustrated and described, it should be understood that changes and modifications can be made therein in accordance with one of ordinary skill in the art without departing from the invention in its broader aspects. Various features of the invention are defined in the following claims.

What is claimed is:

1. A method for a first person communicating with a second person at a distance to activate and use a communications unit comprising the steps of:
    a first person approaching a two way communications system having a coupled computer with at least a first person monitoring device comprising a video display for sensing visual information and contained in a communications unit which allows hands-free dialing and mode changes without using physical contact with the communications unit;
    activating the communications unit by the first person coming within detectable range of the video display and proximity/motion detector disposed within the communications system;
    initializing the communications unit by at least one of the steps of inserting payment into a receptacle and inserting an encoded card into a card reader; and
    generating a signal, which comprises generating the visual information from the video display in the form of the first person positioning a hand in a certain way and without using physical contact with the communications unit for sensing by the video display and thereby causing the video display to interact with the computer to connect the communications unit to the desired communications location and enable communication between the first person and the second person at a distance.

2. The method as defined in claim 1 wherein the video signal comprises visual information.

3. The method of claim 1 wherein the proximity/motion detector is at least one of an infrared detector and an RF detector.

4. The method as defined in claim 1 with the communications unit further including a video unit for displaying in at least two dimensions at least one of the first person, the second person and the location of the first person or the second person.

5. The method of claim 1 further comprising a step for controlling a mode of communication, wherein the mode is selected from a group consisting of private, semi-private, conferencing, maintaining a connection and disconnecting.

6. The method of claim 1 further comprising a step for controlling volume of voice transmission through hand positioning body movements.

7. A method for a first person communicating with a second person at a distance to activate and use a communications unit, comprising the steps of:
    a first person approaching a two way communications unit having a coupled computer with a video display, a voice-activation device, a speaker and an audio sensor contained in the communications unit;
    activating the communications unit by the first person positioning his hand in a certain way which is sensed by the video display, and without physical contact by the first person with the communications unit, and generating a visual information signal for connecting to a second person at a distance at a desired communications location--thereby causing the computer and the video display to connect the communications unit to the desired communications location and enable, at least one of voice communication and generating the visual information by the video display, between the first person and the second person at a distance.

8. The method of claim 7 wherein an established communications is automatically terminated after a preprogrammed period of time if no activity is received by the voice activation device.

9. A method for communicating by a first person with a second person at another location to activate communication by a communications unit, comprising the steps of:
    a first person activating the communications unit;
    initializing the communications unit by at least one of the steps of inserting payment into a receptacle and inserting an encoded card into a card reader;
    providing a video display to generate a video signal accomplished without physical contact with the communications unit by positioning of the first person's hand in a certain way for sensing by the video display of positioning of the first person's hand to enable communication to the second person at another location, thereby causing the communications unit to connect to the desired another location; and
    controlling volume of voice transmission through body language motion of the first person by positioning his hand in a certain way for sensing by the video display which interacts with the communications unit to control the volume.

10. The method of claim 9 further including a proximity detector for detecting the presence of the first person wherein the proximity/motion detector is an infrared detector.

11. The method of claim 9 wherein the proximity/motion detector for detecting the presence of the first person is an RF detector.

12. The method of claim 9 further comprising a step for controlling a mode of communication, wherein the mode is selected from a group consisting of private, semi-private, conferencing, maintaining a connection and disconnecting.

13. The method of claim 9 further comprising a step for controlling volume of voice transmission through at least one of voice commands by the first person to the communications unit and by a computer which senses sound level.

14. The method of claim 9 wherein an established communication is automatically terminated after a preprogrammed period of time if no audio or video activity is sensed by the unit.

15. The method of claim 9 further including the step of adjusting the volume level output by a computer responsive to background noise level.

* * * * *